United States Patent [19]

Hayashi

[11] 4,261,023
[45] Apr. 7, 1981

[54] MAGNETIC RECORDING REPRODUCING APPARATUS

[75] Inventor: Hideaki Hayashi, Tokyo, Japan

[73] Assignee: Tokyo Magnetic Printing Company, Ltd., Tokyo, Japan

[21] Appl. No.: 30,559

[22] Filed: Apr. 16, 1979

[30] Foreign Application Priority Data

May 1, 1978 [JP] Japan .................................. 53-55960
Dec. 1, 1978 [JP] Japan .......................... 53-166620[U]

[51] Int. Cl.³ ........................ G11B 5/00; G11B 25/04
[52] U.S. Cl. ......................................... 360/94; 360/2; 360/15; 360/88; 235/449; 235/493
[58] Field of Search .................... 360/2, 17, 15, 93–94, 360/88, 130.2; 235/449, 450, 493

[56] References Cited

U.S. PATENT DOCUMENTS

| 3,277,244 | 10/1966 | Frost | 360/17 |
|---|---|---|---|
| 3,852,817 | 12/1974 | Budrose | 360/94 X |
| 3,872,502 | 3/1975 | Wild | 360/2 |
| 3,975,767 | 8/1976 | Dudrose | 360/94 X |

Primary Examiner—John H. Wolff

Attorney, Agent, or Firm—Kerkam, Stowell, Kondracki & Clarke

[57] ABSTRACT

A magnetic recording reproducing apparatus is made ready to operation by insertion thereto of a pack housing an endless recording medium. When a magnetic card is inserted into the apparatus with the pack inserted thereto, the contents, informations or data recorded on the magnetic card are read out and recorded on the endless recording medium and then the recorded contents, informations or data are reproduced from the endless recording medium. After passage of the magnetic card through the apparatus, the reproduction from the endless recording medium will repeatedly continue. When a magnetic card is inserted into the apparatus without any pack inserted thereto, a direct reproduction from the magnetic card is performed. When another type of a pack housing an endless recording medium having a longer playing time period is inserted into the apparatus, the reproduction from the recording medium can be effected, and any information transfer from the magnetic card to the recording medium cannot be performed and any direct reproduction from the magnetic card cannot be effected.

5 Claims, 7 Drawing Figures

MAGNETIC RECORDING REPRODUCING APPARATUS

BACKGROUND OF THE INVENTION

1. Field of the Invention

This invention relates to a magnetic recording reproducing apparatus for magnetic cards and magnetic recording tapes, and more particularly to a magnetic recording reproducing apparatus which can repeatedly reproduce the contents, informations or data recorded on an endless recording medium.

2. Description of the Prior Art

A magnetic card generally comprises a card substrate made of paper or plastic and a magnetic layer formed over the entire of one surface of the substrate or a magnetic stripe formed over a portion of one surface of the substrate. In the magnetic layer or stripe, voice or digital informations can be recorded. A conventional reproducing system for such magnetic cards comprises a card transporting capstan roll and a reproducing head spring-biased opposite to the roll. The transporting capstan roll is driven at a constant speed by a motor. A magnetic card is inserted into between the transporting capstan roll and the reproducing head so that the magnetic layer or stripe of the card may contact the reproducing head, and then the magnetic card can be transported by the roll, whereby the reproduction from the card can be performed. In the case of using such a magnetic card for language learning, a student inserts the magnetic card into the reproducing system, looking at the characters, explanatory notes or pictures printed on the card and hears the sound reproduced from the magnetic layer or stripe of the card. Thus, he can learn a language simultaneously hearing and seeing.

Although magnetic cards cannot be used for a long sound recording and reproducing, they have the advantages that they can be accessed at random, that they can have characters, pictures or explanatory notes printed thereon, and that they can be repeatedly reproduced any times. For this reason, the magnetic cards are specifically suitable for use in learning foreign languages, practicing the pronunciation of words or conversation. The conventional reproducing system as described above has the disadvantages that it is inconvenient for looking at the informations printed on the card because the card is being moved during reproduction, that the card must be inserted into the system each times for repeated reproduction and that the card tends to be damaged because of the repetition of insertion. To eliminate the above disadvantages, a magnetic recording reproducing apparatus has been proposed by the inventor of this invention and disclosed in Japanese Utility Model Application No. 3778/1977 (Japanese Utility Model Application Public Disclosure No. 100214/1978) and Japanese Utility Model Application No. 170883/1976 (Japanese Utility Model Application Public Disclosure No. 88117/1978) wherein the contents, informations or data recorded in a magnetic card are transferred by magnetic contact printing onto an endless recording medium and then the transferred informations are continuously and repeatedly reproduced from the endless recording medium. Such an apparatus employs the recording and reproducing system of a cassette-type tape recorder to transfer the sound recorded in a magnetic card to an endless recording tape in the form of one loop and then repeatedly reproduce the transferred sound from the recording tape. This system has the advantages that the contents recorded in a magnetic card can be continuously repeatedly reproduced only by inserting the card into the system once, keeping the card at hand, and that a cassette-type tape can be inserted into the system in place of the one-loop-type tape for reproduction of informations much longer than those in the one-loop type tape. However, this system has the disadvantages that it is comparatively expensive because of utilization of cassette-type tape recording and reproducing system, that the starting operation for the system is cumbersome since a play starting button must be depressed to start the system after a cassette housing a recording tape is set to the system, and that the repeated reproduction from a cassette-type tape requires rewinding of the tape.

Therefore, it is an object of this invention to provide a simple and inexpensive magnetic recording reproducing apparatus which can continuously repeatedly reproduce the contents recorded in a magnetic card by only inserting the card into the apparatus once and can reproduce the contents recorded in the card only one time if desired.

SUMMARY OF THE INVENTION

According to one feature of this invention, a magnetic recording reproducing apparatus comprises a station into which a magnetic card is to be inserted, a station into which a pack housing an endless recording medium is to be inserted, and a control circuit. In the magnetic card inserting station there are provided a magnetic card driving means for transporting the magnetic card, a magnetic card reproducing means for reproducing the contents, informations or data recorded in the card and a first switching means adapted to be actuated by inserting the magnetic card into the magnetic card inserting station. In the pack inserting station there are provided a driving means for transporting the endless recording medium, a recording means for receiving the reproduced informations from the magnetic card reproducing means and recording them on the endless recording medium, a reproducing means for reproducing the informations recorded on the endless recording medium and a second switching means adapted to be actuated by inserting the pack into the pack inserting station. The control circuit is arranged so that at least the magnetic card driving means and the magnetic card reproducing means may be energized when only the first switching means is actuated, the magnetic card driving means, the magnetic card reproducing means, the endless recording medium driving means, the recording means and the endless recording medium reproducing means may be energized, whereby the informations recorded in the magnetic card are recorded to the endless recording medium and the recorded informations are reproduced from the endless recording medium, when the first and second switching means are actuated, and the endless recording medium driving means and the endless recording medium reproducing means may be energized when only the second switching means is actuated.

According to another feature of this invention, the pack inserting station of the magnetic recording reproducing apparatus further includes a third switching means which is adapted to be actuated to cause the control circuit to prevent the recording means from being energized, irrespectively of the actuation of the first switching means, when another pack housing an endless recording medium having a playing time period longer than that of the above recording medium is inserted into the pack inserting station.

According to a still another feature of this invention, the magnetic card driving means and the endless recording medium driving means comprise a common driving roll.

According to a still further feature of this invention, the magnetic card driving means and the endless recording medium driving means comprise a separate driving roll.

According to a further feature of this invention, the diameter of the driving roll of the endless recording medium driving means is smaller than that of the driving roll of the magnetic card driving means.

DESCRIPTION OF THE PREFERRED EMBODIMENTS

Figure 1:
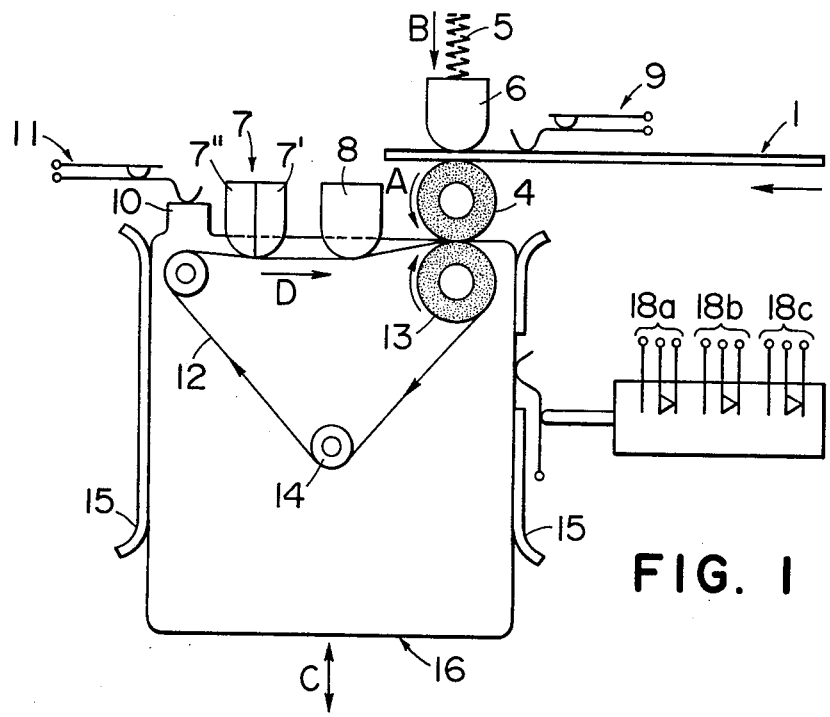
FIG. 1 schematically shows an embodiment of the magnetic recording reproducing apparatus according to this invention in an operating condition.
Figure 2:
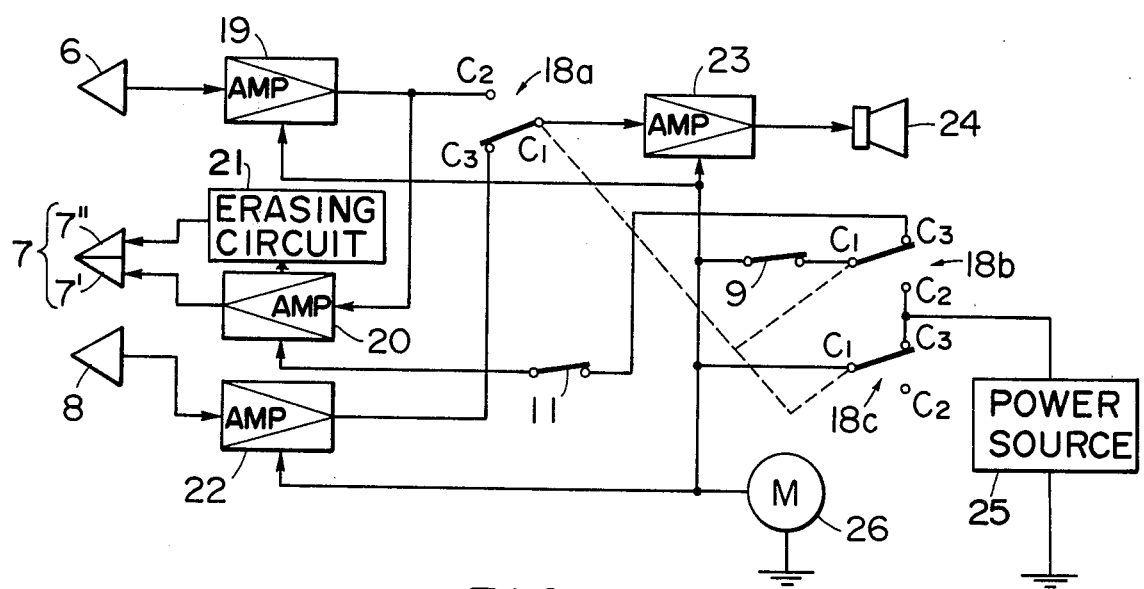
FIG. 2 is a block diagram of the electric circuit of the apparatus shown in FIG. 1.
Figure 3:
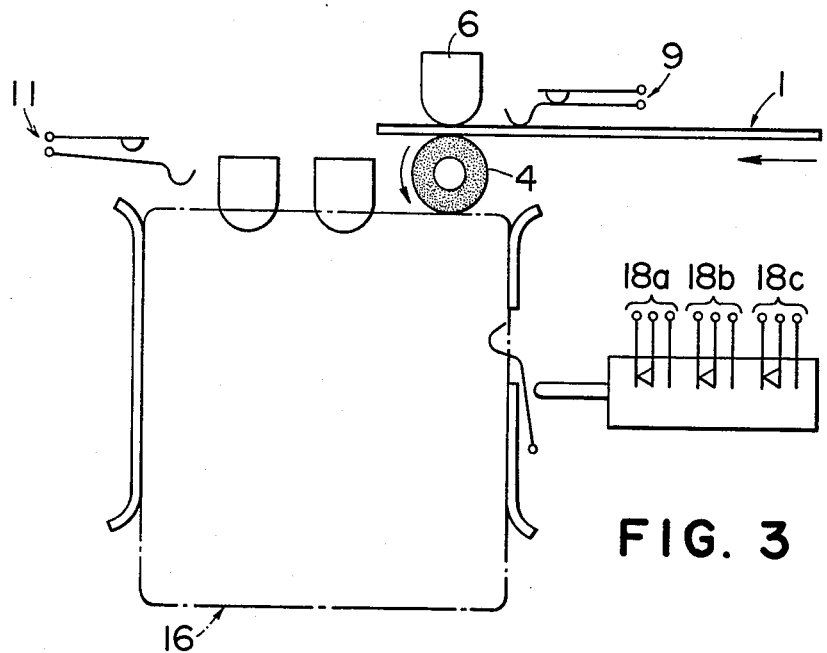
FIG. 3 schematically shows the apparatus of FIG. 1 in a different operating condition.
Figure 4:
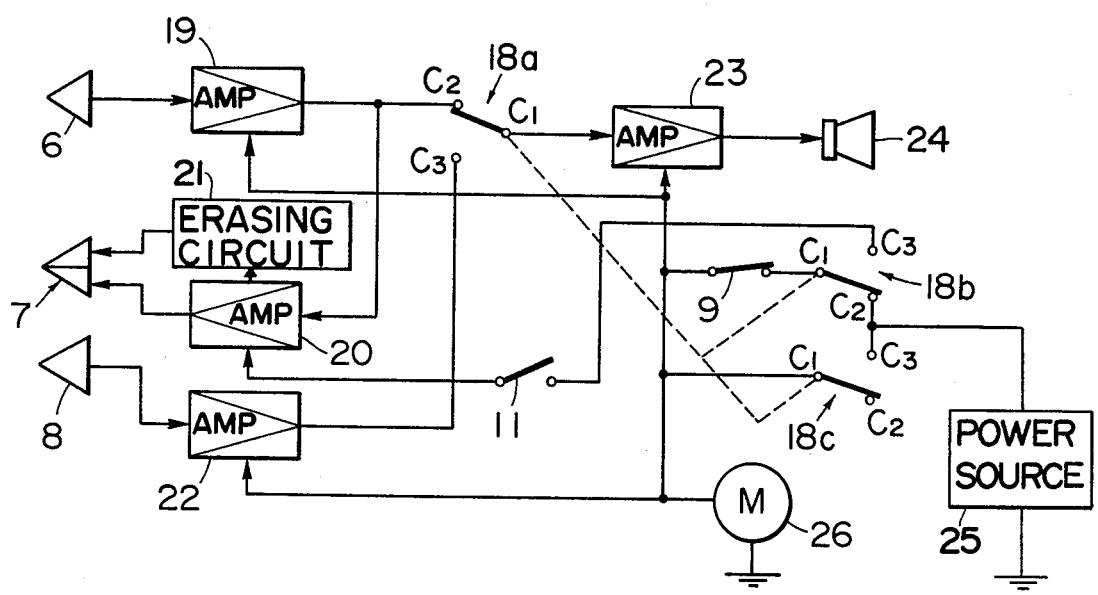
FIG. 4 is a block diagram of the electric circuit of the apparatus shown in FIG. 3.
Figure 5:
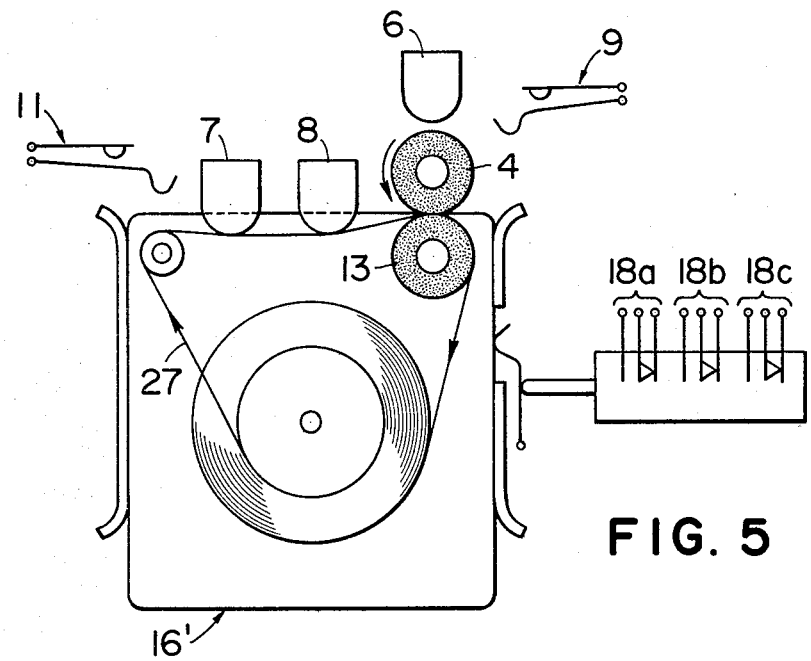
FIG. 5 schematically shows the apparatus of FIG. 1 in a further different operating condition.
Figure 6:
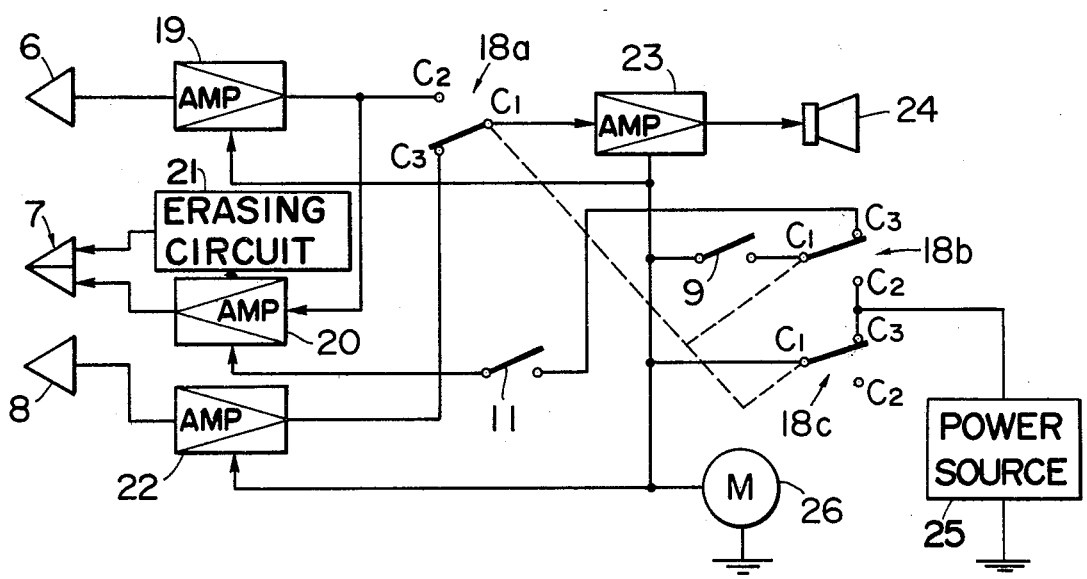
FIG. 6 is a block diagram of the electric circuit of the apparatus shown in FIG. 5.

FIG. 1 schematically shows an embodiment of the magnetic recording reproducing apparatus according to this invention in the operating condition wherein the contents recorded in a magnetic card are transferred to a one-loop type magnetic recording tape and then the transferred contents are repeatedly reproduced from the tape. The electric control circuit of the apparatus in a condition corresponding to that of FIG. 1 is shown in FIG. 2. FIG. 3 schematically shows the apparatus of FIG. 1 in the condition wherein the contents recorded in a magnetic card are directly reproduced. FIG. 4 is a block diagram of the electric control circuit in a condition corresponding to that of FIG. 3. FIG. 5 schematically shows the apparatus of FIG. 1 in the condition wherein the contents recorded in an endless magnetic recording tape are reproduced. The electric control circuit in a condition corresponding to that of FIG. 5 is shown in FIG. 6.

Referring now to FIG. 1, a driving roll 4 is rotated at a constant speed in the direction of the arrow A by means of, for example an electric motor (not shown). A magnetic card reproducing head 6 is biased in the direction of the arrow B by a spring 5. A switch 9 is disposed in a magnetic card inserting station and can be actuated when a magnetic card 1 is inserted into the station. More particularly, when the magnetic card 1 is inserted into between the driving roll 4 and the reproducing head 6 with the magnetic layer of the card 1 facing the head 6, the magnetic card 1 is transported at a constant speed by the driving roll 4 and the contents, informations or data recorded in the card 1 are reproduced by the head 6. On the other hand, a pack 16 made of, for example a plastic material contains a one-loop type magnetic recording tape 12. The tape 12 is free to be endlessly transported through about a pinch roller 13 and tape guides 14. A recording and erasing head 7 and a reproducing head 8 are arranged so as to contact the magnetic surface of the one-loop tape 12. A switch 11 is disposed in a pack inserting station and can be actuated by the projecting portion 10 of the pack 16 when the pack 16 is inserted into the station. Interlocking switches 18a, 18b and 18c are disposed in the pack inserting station and can be actuated upon inserting of the pack 16 into the station. A pair of pack guides 15 are provided to guide sliding insertion of the pack 16 into the station in the direction of the arrow C. When the pack 16 is inserted into the station as shown in FIG. 1, the one-loop tape 12 is transported in the direction of the arrow D by the driving roll 4 in cooperation with the pinch roller 13 and informations are recorded in the tape 12 by the recording head 7 and then the recorded informations are reproduced from the tape 12 by the one-loop tape reproducing head 8. The operation wherein the contents recorded in a magnetic card are repeatedly reproduced will be described in connection with FIG. 2. When the pack 16 is inserted into the pack inserting station, the contacts $C_1$ of the switches 18a, 18b and 18c make contact with the contacts $C_3$ thereof. Then, an amplifier 19, a one-loop tape reproducing amplifier 22, a main amplifier 23 and an electric motor 26 are energized by a power source 25 through the switch 18c. Thus the one-loop tape starts to be transported. In this condition, the switch 11 is made "ON" by the projecting portion 10 of the pack 16. However, since a magnetic card is not inserted into the card inserting station and the switch 9 is made "OFF", a recording amplifier 20 and an erasing biasing circuit 21 are not energized. Thereafter, when a magnetic card 1 is inserted into the card inserting station, the switch 9 is made "ON" by the card 1 and thus the recording amplifier 20 and the erasing biasing circuit 21 are energized by the power source 25 through the contacts $C_3$–$C_1$ of the switch 18c, the switch 9, the contacts $C_1$–$C_3$ of the switch 18b and the switch 11. Under this condition, the signals previously recorded in the one-loop tape 12 are erased by the erasing head 7''. The signals recorded in the card 1 are reproduced by the card reproducing head 6 and amplified by the reproducing amplifier 19. The reproduced and amplified signals are fed to the recording amplifier 20 and recorded in the one-loop tape 12 by the recording head 7' together with biasing signals. The signals thus recorded in the tape 12 are reproduced by the one-loop tape reproducing head 8 and amplified by the reproducing amplifier 22. The reproduced and amplified signals are fed to a speaker 24 through the contacts $C_3$–$C_1$ of the switch 18a and the main amplifier 23. When reproduction from the magnetic card 1 is completed and the trailing end of the card 1 passes through the switch 9, the switch 9 is made "OFF", so that the recording amplifier 20 and the erasing biasing circuit 21 are deenergized. After that, the signals recorded in the tape 12 are repeatedly reproduced by the reproducing head 8.

In connection with FIGS. 3 and 4, the operation wherein a direct reproduction from a magnetic card is performed will be described. As shown in FIG. 3, no pack is inserted into the pack inserting station. Therefore, the contacts $C_1$ of the switches 18a, 18b and 18c make contact with the contacts $C_2$ thereof. Before a magnetic card is inserted into the card inserting station, the switch 9 is made "OFF", so that all components of the circuit including the electric motor 26 are deenergized. When a magnetic card 1 is inserted into the card inserting station as shown in FIG. 3, the switch 9 is made "ON". In this condition, the amplifier 19, 22 and 23 and the electric motor 26 are energized by the power source 25 through the contacts $C_2$-$C_1$ of the switch 18$b$ and the switch 9, though the recording amplifier 20 and the erasing biasing circuit 21 are still deenergized. The magnetic card 1 is transported at a constant speed by the driving roll 4 and the signals recorded in the card 1 are reproduced by the reproducing head 6 and amplified by the reproducing amplifier 19. The reproduced and amplified signals are fed to the speaker 24 through the contacts $C_2$-$C_1$ of the switch 18$a$ and the main amplifier 23. When the reproduction from the card 1 is completed and the trailing end of the card 1 passes through the switch 9, the switch 9 is made "OFF", so that all components of the circuit including the electric motor 26 are deenergized. As a result, reproduction from the card 1 can be only effected once, but never repeated.

Finally, in connection with FIGS. 5 and 6, the operations wherein reproduction from another endless tape is performed will be described. When another type of pack 16' (with a recording preventing means) housing an endless magnetic recording tape 27 having a longer playing time period is inserted into the pack inserting station as shown in FIG. 5, the reproducing amplifiers 19 and 22, the main amplifier 23 and the electric motor 26 are energized through the contacts $C_3$-$C_1$ of the switch 18c, as shown in FIG. 6. The endless tape 27 is transported at a constant speed by the driving roll 4 in cooperation with the pinch roller 13 and the signals recorded in the endless tape 27 are reproduced by the reproducing head 8. Since the pack 16' has no projection such as the projection 10 of the pack 16, the switch 11 maintains "OFF". Therefore, even if the switch 9 is made "ON" through the insertion of a magnetic card into the card inserting station, the recording amplifier 20 and the erasing biasing circuit 21 maintain deenergized to prevent any recording onto the endless tape 27. The signals reproduced by the reproducing head 8 are amplified by the reproducing amplifier 22 and then fed to the speaker 24 through the contacts $C_3$-$C_1$ of the switch 18$a$. Since the tape 27 is much longer than the one-loop tape 12 and the leading end of the tape 27 is connected to the trailing end thereof as in the one-loop tape 12, reproduction from the tape 27 can be repeatedly performed at a period longer than in the one-loop tape 12.

In this embodiment, since the card and the one-loop tape or the endless tape are transported by means of the same driving roll, the apparatus is very simple in construction.

Figure 7:
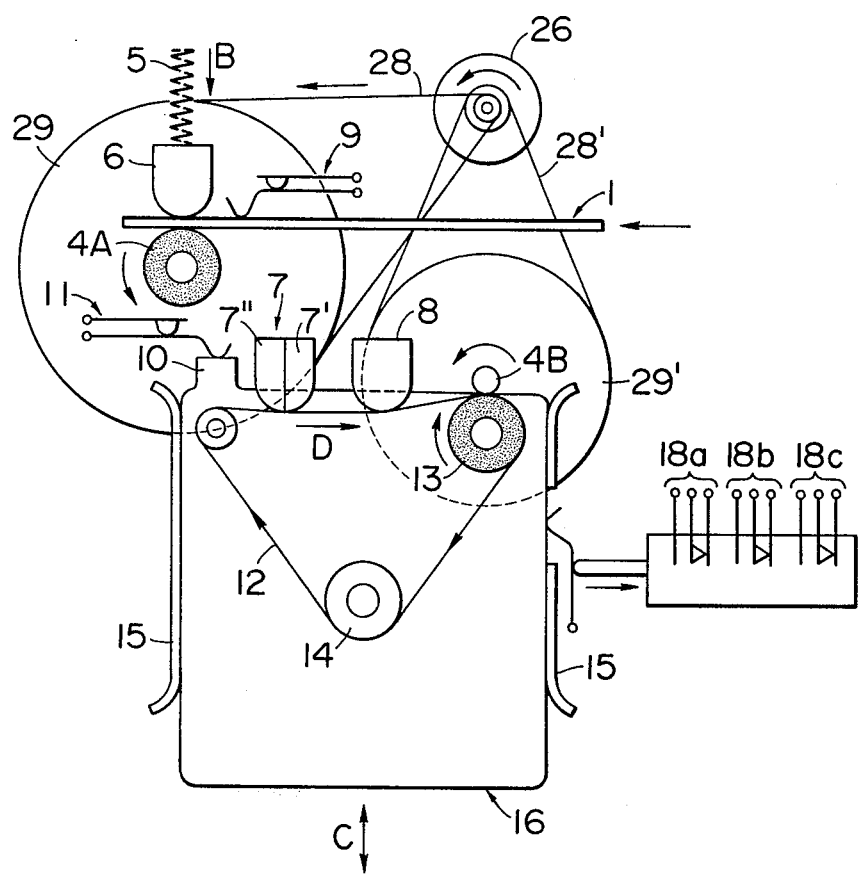
FIG. 7 schematically shows another embodiment of the magnetic recording reproducing apparatus according to this invention in the same operating condition as that of the apparatus shown in FIG. 1.

FIG. 7 schematically shows another embodiment of the magnetic recording reproducing apparatus according to this invention. The apparatus of FIG. 7 has the essentially same construction and function as those of FIGS. 1 to 6, except that the magnetic card driving means and the endless recording medium driving means comprise a separate driving roll. In FIG. 7, the components corresponding to those of the apparatus of FIGS. 1 to 6 are indicated by means of like numeral reference. In the embodiment of FIG. 7, a driving roll 4A for transporting a magnetic card 1 is rotated at a constant speed in the direction of the arrow by an electric motor 26 through a belt 28 and a flywheel 29, while a driving roll 4B for transporting an endless recording medium 12 contained in a pack 16 is rotated in the direction of the arrow by the motor 26 through a belt 28' and a flywheel 29'. The driving roll 4A is generally made of a rubber material to prevent any slip. Furthermore, the diameter of the driving roll 4A is selected to permit a magnetic card to be inserted into between the driving roll 4A and the reproducing head opposite the driving roll. On the other hand, the driving roll 4B is generally smaller in diameter than the driving roll 4A and is rotated at a speed higher than the driving roll 4A in order to reduce wow or flutter. As described above, in the embodiment of FIG. 7, since the card driving roll and the endless tape driving roll are separated, it is possible to make the diameter of the endless tape driving roll smaller and make the rotation speed thereof higher in order to reduce wow or flutter, regardlessly of the reproducing speed of the magnetic card. Therefore, the embodiment of FIG. 7 may be used to successfully perform a musical reproduction in which wow or flutter should be avoided. Moreover, since the diameter of the endless tape driving roll can be made small, the window for tape driving in the endless tape pack can be small to minimize an exposed portion of the endless tape. This is important from the viewpoint of protection of the tape.

As will be seen from the above, in the apparatus of this invention, the contents recorded in a magnetic card can be continuously and repeatedly reproduced only by inserting the card into the apparatus once, and if desired, the contents recorded in a magnetic card can be reproduced only one time. Furthermore, by inserting a pack of another type housing an endless tape having informations recorded therein, much longer than in a magnetic card into the apparatus, the long informations can be repeatedly reproduced. In addition, since in the apparatus of this invention the power source can be switched on and off only by insertion of a magnetic card or a pack, operation is very simple. Particularly, since the sliding insertion of a pack can bring the apparatus into an operating condition, it does not require any two-step operation which would be required in a conventional cassette type tape recorder, namely to set a cassette in the recorder and then push a playing starting button. Thus the apparatus of this invention is simple in construction and operation, and can be advantageously used as for example, a language learning machine.

I claim:

1. A magnetic recording reproducing apparatus comprises a station into which a magnetic card is to be inserted, a station into which a pack housing an endless recording medium is to be inserted, and a control circuit, said magnetic card inserting station having provided therewith a magnetic card driving means for transporting a magnetic card when inserted thereinto, a magnetic card reproducing means for reproducing the contents, information or data recorded in said card and a first switching means adapted to be automatically actuated by inserting said magnetic card into said magnetic card inserting station, said pack inserting station having provided therewith a driving means for transporting said endless recording medium, a recording means for receiving the reproduced information from said magnetic card reproducing means and recording them on said endless recording medium, a reproducing means for reproducing the information recorded on said endless recording medium and a second switching means adapted to be automatically actuated by inserting said pack into said pack inserting station, and said control circuit being arranged so that at least said magnetic card driving means and said magnetic card reproducing means may be energized when only said first switching means is actuated, said magnetic card driving means, said magnetic card reproducing means, said endless recording medium driving means, said recording means and said endless recording medium reproducing means may be energized, whereby the information recorded in said magnetic card is transferred to said endless recording medium and the transferred information is reproduced from said endless recording medium, when said first and second switching means are actuated, and said endless recording medium driving means and said endless recording medium reproducing means may be energized when only said second switching means is actuated.

2. A magnetic recording reproducing apparatus as claimed in claim 1 wherein said pack inserting station further includes a third switching means adapted to be automatically actuated to cause said control circuit to prevent said recording means from being energized, irrespectively of the actuation of said first switching means, when another pack housing an endless recording medium having a playing time period longer than that of the first mentioned recording medium is inserted into said pack inserting station.

3. A magnetic recording reproducing apparatus as claimed in claim 1 or 2 wherein said magnetic card driving means and said endless recording medium driving means comprise a common driving roll.

4. A magnetic recording reproducing apparatus as claimed in claim 1 or 2 wherein said magnetic card driving means and said endless recording medium driving means comprise a separate driving roll.

5. A magnetic recording reproducing apparatus as claimed in claim 4 wherein the diameter of said driving roll of said endless recording medium driving means is smaller than that of said driving roll of said magnetic card driving means.

* * * * *